United States Patent
Dantu et al.

(10) Patent No.: US 7,225,238 B1
(45) Date of Patent: May 29, 2007

(54) METHOD AND SYSTEM FOR PROVIDING SERVICES FOR WIRELESS DATA CALLS

(75) Inventors: Ramanamurthy Dantu, Richardson, TX (US); Pulin R. Patel, McKinney, TX (US); Pravir A. Patel, Plano, TX (US); Alexander G. Garbuz, Plano, TX (US); Jerzy Miernik, Allen, TX (US); Achal R. Patel, McKinney, TX (US); Balaji S. Holur, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 09/696,827

(22) Filed: Oct. 25, 2000

(51) Int. Cl.
*G06F 15/16* (2006.01)
*H04M 11/00* (2006.01)
*H04Q 7/20* (2006.01)

(52) U.S. Cl. .................. 709/219; 709/218; 455/408; 455/442

(58) Field of Classification Search ............... 709/207; 455/414.1, 422, 556, 414, 439, 436; 705/39
See application file for complete search history.

(56) References Cited

U.S. PATENT DOCUMENTS

| | | | |
|---|---|---|---|
| 5,487,175 A | 1/1996 | Bayley et al. ............ 455/54.2 |
| 5,701,297 A | 12/1997 | Csapo et al. ............. 370/341 |
| 5,818,871 A | 10/1998 | Blakeney, II et al. ....... 375/220 |
| 5,825,759 A | 10/1998 | Liu ......................... 370/331 |
| 5,933,778 A | 8/1999 | Buhrmann et al. .......... 455/461 |
| 6,009,096 A | 12/1999 | Jaisingh et al. ............ 370/395 |
| 6,038,595 A | 3/2000 | Ortony ..................... 709/218 |
| 6,336,137 B1* | 1/2002 | Lee et al. .................. 709/219 |
| 6,401,113 B2* | 6/2002 | Lazaridis et al. .......... 709/207 |
| 6,571,221 B1* | 5/2003 | Stewart et al. ............. 705/52 |
| 6,622,016 B1* | 9/2003 | Sladek et al. ............ 455/414.1 |
| 6,782,253 B1* | 8/2004 | Shteyn et al. ............ 455/414.1 |
| 6,982,962 B1* | 1/2006 | Lunsford et al. ........... 370/278 |
| 7,058,033 B1* | 6/2006 | Dantu et al. ............... 370/331 |
| 7,107,342 B1* | 9/2006 | Holur et al. ............... 709/225 |
| 2002/0029189 A1* | 3/2002 | Titus et al. ................ 705/39 |
| 2002/0055351 A1* | 5/2002 | Elsey et al. ............... 455/414 |
| 2003/0185370 A1* | 10/2003 | Rosera et al. ........... 379/207.02 |
| 2005/0014483 A1* | 1/2005 | Lagerstrom ............... 455/405 |

* cited by examiner

*Primary Examiner*—Fan Tsang
*Assistant Examiner*—Lisa Hashem
(74) *Attorney, Agent, or Firm*—Baker Botts L.L.P.

(57) ABSTRACT

A method and system for providing services for wireless data calls includes monitoring a wireless data call for a predefined event associated with a service for the wireless data call. The service is initiated for the wireless data call in response to detecting the predefined event for the data call. The predefined event may comprise a uniform resource locator (URL) match or change, excess use of transmission or time resources, a location change of a mobile device for the wireless data call, a network event, or a combination of any or all suitable events.

26 Claims, 25 Drawing Sheets

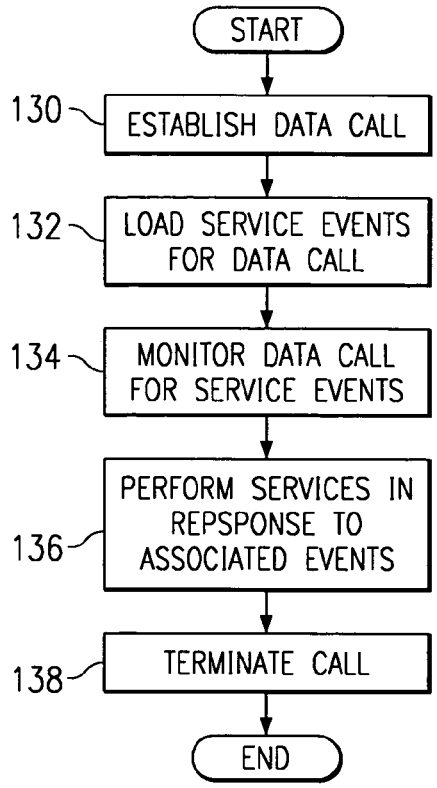

| XML: DATA ORG | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Call Type | M | Data Call |
| Calling Party Number | M | |
| Called Party Number | O | |
| Transaction Capability | M | List of triggers supported by AA at current time |

| XML: data org | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| Call Type | M | |
| Action Response | M | If denied, reason is included |
| Triggers | O | |

FIG. 6A

| XML: DATA BEGIN | | |
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Session ID | M | |
| Call Type | M | |
| Mobile' IP address | O | |
| Username | O | username@realm.com |
| Data Session Initiation Time Stamp | M | |

FIG. 6B

| XML: data begin | | |
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Call Type | M | |
| Action Response | M | Why data session is rejected |

FIG. 7A

| | XML: DATA END | |
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Call Type | M | |
| Session ID | M | |
| Session Termination Time Stamp | M | |
| Release Reason | O | |
| Session Records | | Number of packets received, number of packets discarded, number of errors, number of voice call attempts |

FIG. 7B

| | XML: data end | |
|---|---|---|
| FIELD | TYPE | COMMENTS |
| Message Identifier | M | |
| Transaction Identifier | M | Associates a given request and reply |
| Length | M | 2 Byte length field |
| Air AgentID | M | |
| MIN/IMSI | M | |
| Session ID | M | |

FIG. 8A

| XML: DATA CLEAR |||
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Call Type | M | |
| Session ID | M | |
| Release Reason | O | |

FIG. 8B

| XML: data clear |||
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |

FIG. 9A

| XML: FWD BY TEXD |||
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Session ID | M | |
| Call Type | M | |
| Byte Count | M | Number of bytes that can be transmitted |

FIG. 9B

| XML: fwd by texd | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |
| Triggers | O | |

FIG. 10A

| XML: REV BY TEXD | | |
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Session ID | M | |
| Call Type | M | |
| Byte Count | M | Number of bytes that can be transmitted |

FIG. 10B

| XML: rev by texd | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |
| Triggers | O | |

FIG. 11A

| XML: TIMEEXD | | |
|---|---|---|
| FIELD | TYPE | COMMENTS |
| Message Identifier | M | |
| Transaction Identifier | M | Associates a given request and reply |
| Length | M | |
| Air AgentID | M | |
| MIN/IMSI | M | |
| Location Information | M | This is combination of switch number, Cell ID, Marketing ID, etc. |
| Session ID | M | |
| Call Type | M | |
| Duration | M | Duration represented by "YearsMonthsDaysHoursMinutesSeconds" |

FIG. 11B

| XML: timeexd | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |
| Triggers | O | |

FIG. 12A

| XML: URLMATCH |||
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| Call Type | M | |
| MIN/IMSI | M | |
| Location Information | M | This is combination of switch number, Cell ID, Marketing ID, etc. |
| Session ID | M | |
| URL Match Time Stamp | O | |
| Current URL Detected | M | |

FIG. 12B

| XML: urlmatch |||
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |
| Triggers | O | |

FIG. 13A

| XML: LOCCHNG | | |
|---|---|---|
| FIELD | TYPE | COMMENTS |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. This is the current location. |
| Type of Change | O | Handoff/sector/administrative boundary |
| Session ID | M | |
| Location Change Time Stamp | O | |
| Previous Location Information | O | |

FIG. 13B

| XML: locchng | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Session ID | M | |
| Trigger Action | O | |

FIG. 14A

| XML: MULTIMATCH | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Time Stamp | O | Year, month, day, hours, minutes and seconds |
| Triggers | O | |
| Trigger Information | O | Trigger information is collected for each trigger and concatenated. Eg., matched URL, matched IP and others. Each trigger component will have trigger information. |

FIG. 14B

| XML: multimatch | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Action Response | O | |

FIG. 15A

| XML: URLCHNG ||| 
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| URL-Change Time Stamp | O | |
| Last URL Accessed by User | M | |
| Current URL | M | |

FIG. 15B

| XML: urlchng ||| 
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Triggers | O | |

FIG. 16A

| XML: DATALERT ||| 
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Alert Information | M | An XML file sent from ISCP to Air Agent |

FIG. 16B

| XML: datalert ||| 
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Action | O | Successfully delivered or an error code denoting that mobile is not accessable. |

FIG. 17A

| XML: FACLCHNG | | |
|---|---|---|
| FIELD | TYPE | COMMENTS |
| Message Identifier | M | |
| Transaction Identifier | M | Associates a given request and reply |
| Length | M | 2 byte length field |
| Air Agent ID | M | |
| MIN/IMSI | M | |
| Location Information | M | This is combination of switch number, Cell ID, Marketing ID, etc. |
| Session ID | M | |
| Reason for Change | O | Handoff/failure/congestion/change in bandwidth |
| Details of Changed Facilities | O | Link bandwidth, change of QoS, degree of congestion |

FIG. 17B

| XML: faclchng | | |
|---|---|---|
| FIELD | TYPE | COMMENTS |
| Message Identifier | M | |
| Transaction Identifier | M | Associates a given request and reply |
| Length | M | 2 byte length field |
| Air AgentID | M | |
| MIN/IMSI | M | |
| Location Information | M | This is combination of switch number, Cell ID, Marketing ID, etc. |
| Session ID | M | |
| Data Session ID | M | |
| Trigger Action | O | |

FIG. 18A

| MESSAGE IDENTIFIER ||||
|---|---|---|---|
| MESSAGE | IDENTIFIER | MANDATORY RESPONSE | COMMENTS |
| DATAORG | 1 | M | |
| DATABEGIN | 2 | O | |
| DATAEND | 3 | O | |
| DATACLEAR | 4 | O | |
| URLMATCH | 5 | O | |
| URLCHNG | 6 | O | |
| FACLCHNG | 7 | O | |
| FWDBYTEXD | 8 | O | |
| REVBYTEXD | 9 | O | |
| TIMEEXD | 10 | O | |
| MULTIMATCH | 11 | O | |
| LOCCHNG | 12 | O | |
| DATALERT | 13 | O | |

FIG. 18B

| DATA TRANSACTION CAPABILITY |
|---|
| Identifier |
| Length |
| LOCCHNG   DATACLEAR   FACLCHNG   URLCHNG   URLMATCH   DATAEND   DATABEGIN   DATAORG |
| FWDBYTEXD   REVBYTEXD   TIMEEXD   MULTIMATCH   DATALERT |

FIG. 18C

| ACTION RESPONSE |
|---|
| Identifier |
| Length |
| Additional reasons for data triggers<br>01 Success<br>02 Access Denied Reason |

FIG. 18D

| CALL TYPE |
|---|
| Identifier |
| Length |
| Type of Call<br>00 Data |

FIG. 18E

| TRIGGERS | | |
|---|---|---|
| FIELD | TYPE | COMMENTS |
| Trigger Identifier | M | See the identifier table |
| Update | M | 1: Update Previous Triggers, 2: Overwrite Existing Triggers |
| FireType | M | 1: One Time 2: Always (when the conditions match) |
| Form | M | 1: DNF 2: CNF |
| TRIGGER COMPONENTS1 | M | |
| TRIGGER COMPONENTS2 | M | |
| TRIGGER COMPONENTS'N | M | |

FIG. 18F

| TRIGGER ACTION |
|---|
| Identifier |
| Length |
| 1) Allow access<br>2) Deny access<br>3) Allow access and inform<br>4) Deny access and inform<br>5) Service logic IP address<br>6) Service logic port type<br>7) Service logic port number<br>8) Service logic application protocol number |

FIG. 18G

| TRIGGER COMPONENT: IP ADDRESS | | |
|---|---|---|
| FIELD | TYPE | COMMENTS |
| Trigger Component Header | M | |
| Type | M | 0: Source 1: Destination |
| Value Type | M | 1: Single Value, 2: Range, 3: Multi Value, 4: Not Applicable. If it is a range then Value1 is min and Value2 is max |
| Value1 | M | Value of IP Address |
| Value2 | M | Value of IP Address |
| Value3 | M | Value of IP Address |
| Value'N | M | Value of IP Address |

FIG. 18H

| TRIGGER COMPONENT: URL | | |
|---|---|---|
| FIELD | TYPE | COMMENTS |
| Trigger Component Header | M | |
| Value1 | M | http://www.yahoo.com |
| Value2 | M | http:www-nrc.nokia.com/mail-archive/ext-ip-location/threads.html |
| Value3 | M | http://search.ietf.org/internet-drafts/draft-kankkunen-vompls-fw-00.txt |
| Value'N | M | http://dailynews.yahoo.com/headlines/business/ |

FIG. 18I

| TRIGGER COMPONENT: HEADER | | |
|---|---|---|
| FIELD | TYPE | COMMENTS |
| Type | M | Component type |
| Negate | M | 1: Negate this condition 0: Don't negate |
| GroupNo | M | Group Number of the Condition (group the trigger component types) |

FIG. 18J

| TRIGGER COMPONENT: TYPE |
|---|
| 1) Origination Request |
| 2) Start of a Session |
| 3) End of a Session |
| 4) IPv4Condition |
| 5) Port Condition |
| 6) URL Match Condition |
| 7) URL Change Condition |
| 8) Forward Byte Count Condition |
| 9) Reverse Byte Count Condition |
| 10) Location Condition |
| 11) Session Time Condition |
| 12) Application Condition |
| 13) Trigger Action |

FIG. 18K

| USERNAME |
|---|
| Identifier |
| Length |
| "username@realm.com (represented as ASCII string) |
| username@realm.com (represented as ASCII string) |
| username@realm.com (represented as ASCII string) |
| username@realm.com (represented as ASCII string) |
| "n characters" |
| username@realm.com (represented as ASCII string)" |

FIG. 18L

| MOBILE'S IP ADDRESS |
|---|
| Identifier |
| Length |
| IP Version 4 or 6 (4 bytes or 12 bytes) |
| IP Address |

FIG. 18M

| DATA SESSION INITIATION TIME STAMP |
|---|
| Identifier |
| Length |
| "YearMonthDayHoursMinutesSeconds" |

FIG. 18N

| DATA SESSION TERMINATION TIME STAMP |
|---|
| Identifier |
| Length |
| "YearMonthDayHoursMinutesSeconds" |

FIG. 18O

| URL MATCH TIME STAMP |
|---|
| Identifier |
| Length |
| "YearMonthDayHoursMinutesSeconds" |

FIG. 18P

| LAST URL ACCESSED BY USER |
|---|
| Identifier |
| Length |
| "http://www.ipmobile.com" |

FIG. 18Q

| CURRENT URL ACCESSED BY USER |
|---|
| Identifier |
| Length |
| "http://www.ipmobile.com" |

FIG. 18R

| RELEASE REASON |
|---|
| Identifier |
| Length |
| Reason<br>00 Facilities not Available at the Terminating End<br>01 Network Resources not Available<br>02 Network Resources Congestion<br>03 Route not Available<br>04 Incoming Voice Call |

FIG. 18S

| REASON FOR FACILITIES CHANGE |
|---|
| Identifier |
| Length |
| Reason<br>00 Handoff<br>01 Failure of Link<br>02 Buffer Congestion in AirGateway<br>03 Change in Bandwidth<br>04 Change in QoS |

FIG. 18T

| CHANGED FACILITIES |
|---|
| Identifier |
| Length |
| Reason<br>  1. Target AirGateway<br>  2. Target AirAgent<br>  3. Failed Link ID<br>  4. New QoS<br>  5. New Bandwidth<br>  6. Degree of Congestion |

FIG. 18U

| SESSION RECORDS |
|---|
| Identifier |
| Length |
| Records for Session<br>  1. Number of FWD Packets/Bytes Received<br>  2. Number of FWD Packets/Bytes Received<br>  3. Number of FWD Packets/Bytes Discarded<br>  4. Number of REV Packets/Bytes Received<br>  5. Number of REV Packets/Bytes Received<br>  6. Number of REV Packets/Bytes Discarded<br>  7. Time Duration of the Session<br>  8. Number of CRC Errors |

METHOD AND SYSTEM FOR PROVIDING SERVICES FOR WIRELESS DATA CALLS

TECHNICAL FIELD OF THE INVENTION

This invention relates generally to the field of wireless communications, and more particularly to a method and system for providing services for wireless data calls.

BACKGROUND OF THE INVENTION

Traditional wireless networks include a number of base stations (BST) and one or more mobile switching centers (MSC). The BSTs each cover a geographic region, or cell of the wireless network and communicate with mobile telephones in the cell. The MSCs provide switch and soft handoff functionality for the wireless network. To support data calls, the wireless network includes a data interworking function (IWF). The IWF connects the wireless network to the Internet or other network.

Current wireless networks are optimized for real-time voice traffic, despite the growing demand for data traffic. For voice traffic, wireless networks typically provide call forwarding, call blocking, call waiting, star dialing and other services. These services enhance the utilization of mobile telephones and allow network operators to differentiate their services.

Due to the differences between voice and data traffic, many wireless voice services are not applicable to data traffic. In addition, service provision nodes for wireless voice and other telephony traffic on the Public Switched Telephone Network (PSTN) are not generally accessible to data calls. Accordingly, wireless network have no provisionable services for data calls, which are differentiated based on quality of service (QoS) parameters.

SUMMARY OF THE INVENTION

The present invention supplies a method and system for providing services for wireless data calls that substantially reduce or eliminate problems and disadvantages associated with previous systems and methods. In particular, call-based and network-based triggers are provided for data calls to support location, filtering and billing based services for data calls.

In accordance with one embodiment of the present invention, a method and system for providing services for wireless data calls includes monitoring a wireless data call for a predefined event associated with a service for the wireless data call. The service is initiated for the wireless data call in response to detecting the predefined event for the data call.

More specifically, in accordance with a particular embodiment of the present invention, the predefined event may be a uniform resource locator (URL) match or change, an excessive use of transmission or time resources of the wireless network or may be based on a location of a mobile device for the wireless data call. In this and other embodiments, the wireless network may be monitored for network-based events associated with network directed services for the wireless data call. The network directed services are initiated for the wireless data call in response to detecting the network-based event for the wireless data call. The network-based event may be a data alert or change in a status of network facilities.

Technical advantages of the present invention include supplying a method and system for providing services for data calls. In particular, call-based and network-based services are provisioned for a data call at call setup. Location, filtering and billing services are provided for the data call based on dynamic, real-time content of the data call and/or network activity.

Another technical advantage of the present invention includes providing an improved wireless network. In particular, services are provided for voice and data calls to allow a network operator to differentiate both voice and data services for mobile subscribers as well as services provided by portals. In addition, the services support shopping and trading to facilitate e-commerce marketing plans and allow network operators to engage in fee sharing for revenue generation and deployment of wireless Internet services.

Still another technical advantage of the present invention includes providing improved services for a wireless call. The services include content monitoring, controlling web sessions and blending existing voice services on top of these data services. In addition, mobility and location based services are provided as well as interactive gaming services.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with the company drawings, in which:

FIGS. 3A–B are flow diagrams illustrating methods for providing services for data calls in the wireless network of FIG. 2 in accordance with one embodiment of the present invention;

FIGS. 5A–B are tables illustrating messages for provisioning data services for a data call in the wireless network of FIG. 2 in accordance with one embodiment of the present invention;

FIGS. 6A–B are tables illustrating messages for initiating data transfer for a data call in the wireless network of FIG. 2 in accordance with one embodiment of the present invention;

FIGS. 7A–B are tables illustrating messages for terminating data transfer for a data call in the wireless network of FIG. 2 in accordance with one embodiment of the present invention;

FIGS. 8A–B are tables illustrating messages for data clear services for a data call in the wireless network of FIG. 2 in accordance with one embodiment of the present invention;

FIGS. 9A–B are tables illustrating messages for forward direction transmission excess services for a data call in the wireless network of FIG. 2 in accordance with one embodiment of the present invention;

FIGS. 10A–B are tables illustrating messages for reverse direction transmission excess services for a data call in the wireless network of FIG. 2 in accordance with one embodiment of the present invention;

FIGS. 11A–B are tables illustrating messages for time excess services for a data call in the wireless network of FIG. 2 in accordance with one embodiment of the present invention;

FIGS. 12A–B are tables illustrating messages for uniform resource locator (URL) matching services for a data call in the wireless network of FIG. 2 in accordance with one embodiment of the present invention;

FIGS. 13A–B are tables illustrating messages for location change services for a data call in the wireless network of FIG. 2 in accordance with one embodiment of the present invention;

FIGS. 14A–B are tables illustrating messages for multiple match services for a data call in the wireless network of FIG. 2 in accordance with one embodiment of the present invention;

FIGS. 15A–B are tables illustrating messages for URL change services for a data call in the wireless network of FIG. 2 in accordance with one embodiment of the present invention;

FIGS. 16A–B are tables illustrating messages for data alert services for a data call in the wireless network of FIG. 2 in accordance with one embodiment of the present invention;

FIGS. 17A–B are tables illustrating messages for facility status services for a data call in the wireless network of FIG. 2 in accordance with one embodiment of the present invention; and FIGS. 18A–U are tables illustrating parameters for the service messages of FIGS. 5–17 in accordance with one embodiment of the present invention.

DETAILED DESCRIPTION OF THE INVENTION

Figure 1:
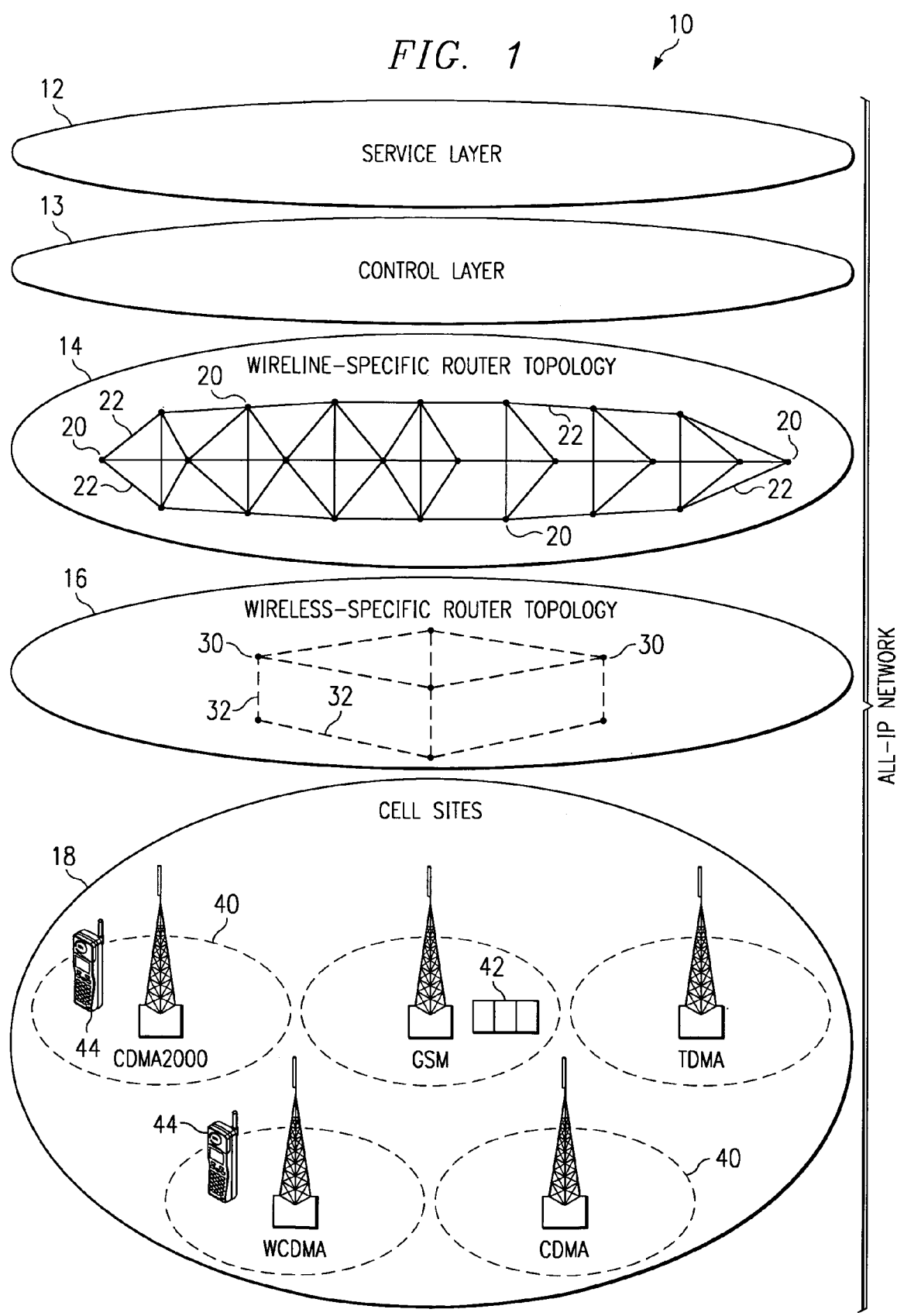
FIG. 1 is a block diagram illustrating layers of an all Internet protocol (IP) wireless communications network in accordance with one embodiment of the present invention.

FIG. 1 illustrates a wireless communications network 10 in accordance with one embodiment of the present invention. In this embodiment, the wireless network 10 is a multiple layer cellular network in which terrestrial wireless transmission originates in geographically delimited cells. It will be understood that the present invention may be used in connection with other suitable wireless networks.

Referring to FIG. 1, the wireless network 10 includes a service layer 12, a control layer 13, a wireline router layer 14, a wireless router layer 16, and a physical layer 18. The service layer 12 provides network services for voice and data calls. Administrative services for establishing and maintaining calls include call server, bandwidth broker, policy server, service level agreement (SLA) manager, billing server, home location register (HLR), home subscriber server (HSS), domain name server (DNS), dynamic host configuration protocol (DHCP), media gateway (MGW), signaling gateway (SGW), legacy servers such as mobile switching center (MSC), base station controller (BSC), serving GPRS serving node (SGSN), voicemail server (VMS), fax/modem server, short message center (SMSC), conferencing facilities and transcoders. As described in more detail below, network services for data calls include location, filtering and billing based services. As also described in more detail below, the control layer 13 provides a quality of service (QoS) manager, mobility manager, location manager, call agent, media gateway controller (MGC), power manager, authentication, authorization, and accounting (AAA), and other suitable agents and managers.

The wireline router layer 14 may be a wireline specific Internet protocol (IP) layer. The wireline router layer 14 includes a wireline router network having a plurality of wireline routers 20 interconnected by physical wireline links 22. The wireline routers 20 receive and transmit traffic on the wireline links 22. The wireline router network forms the core IP network and may be the Internet, intranet, extranet, or other suitable local, wide area network, or combination of networks.

The wireless router layer 16 may be a wireless-specific IP layer. The wireless router layer 16 includes a wireless router network having a plurality of wireless routers 30 interconnected by wireless router links 32. The wireless router links 32 may be microwave or other wireless links or virtual or other suitable flows configured in the wireline links 22 of the wireline IP layer 14. Each wireless router 30 may be implemented as a discrete node independent of a wireline router 20 or may be implemented as a logical layer in a wireline router 20. As used herein, each means every one of at least a subset of the identified items.

The wireless routers 30 intercommunicate traffic and control information over the wireless router links to perform call set up, resource reservation, mobility management, soft handoff, air bandwidth allocation and routing. As described in more detail below, the wireless router links 32 may comprise multi-protocol label switch (MPLS) or other suitable virtual tunnels formed in the wireline links 22. The wireless routers 30 may be self-configuring as described in co-owned U.S. patent application Ser. No. 09/513,090, entitled "Method and System for Configuring Wireless Router and Network," which is hereby incorporated by reference.

The wireless routers 30 are connected to the wireline routers 20 by wireline links. In this way, the wireless routers 30 provide connectivity from the wireless portion of the network 10 to the wireline portion of the network 10 via circuit switched and packet switched data protocols. Thus, the wireless routers 30 receive and route traffic over both wireline and wireless links 22 and 32.

The physical layer 18 includes a series of overlapping cells 40. Each cell 40 is supported by a corresponding wireless router 30 and may be subdivided into a plurality of geo-location areas 42. The geo-location areas 42 are each a defined area in which bandwidth may be allocated to mobile devices 44. Further information regarding the geo-location areas and allocation of bandwidth within geo-location areas is described in co-owned U.S. patent application Ser. No. 09/466,308, entitled "Method and System for Allocating Bandwidth in a Wireless Communications Network," filed Dec. 17, 1999, which is hereby incorporated by reference.

In the wireless network 10, each wireless router 30 provides a radio frequency (RF) link for mobile devices 44 within a corresponding cell 40. The wireless RF link to the mobile devices 44 in the cell 40 may be based on established technologies, or standards such as IS-54 (TDMA), IS-95 (CDMA), GMS and AMPS, 802.11 based WLAN, or new upcoming technologies such as CDMA 2000 and W-CDMA or proprietary radio interfaces. The mobile devices 44 may be cell phones, data phones, data devices, portable computers, handheld devices, network appliances or any other suitable device capable of communicating information over a wireless link.

In operation, the wireless routers 30 each have a defined bandwidth with which to communicate with the mobile devices 44 in the cells 40. The bandwidth is used by the wireless router 30 and the mobile devices 44 to communicate voice and data information. The supported bandwidth is a function of various factors such as frequency reuse, carrier to interface ratio, bit-energy to noise ratio, effective bit-rate per connection and the like. The bandwidth available to allocate to certain flows is geo-location dependent, and time dependent based on current usage of other flows in the geo-neighborhood.

The wireless routers 30 each allocate bandwidth within a corresponding cell 40, route traffic to and from the cell 40, and track the location of the mobile devices 44 within the cell 40. The position of a mobile device 44 may be determined using network-assist, global position systems (GPS) and radio frequency fingerprinting. Preferably, the positioning technique provides fast and accurate information with respect to the location of the mobile device 44 to minimize acquisition time for position information.

As mobile users move from cell 40 to cell 40, the wireless routers 30 perform soft handoff operations to provide continuous connectivity within the network. The wireless routers 30 provide additional call control and switching functionality to provide an all-IP wireless access network with seamless interworking with core IP network elements in a distributed control architecture. Further information regarding operation of the wireless routers is described in co-owned U.S. patent application Ser. No. 09/513,914, entitled "Wireless Router and Method for Processing Traffic in a Wireless Communications Network," filed Feb. 25, 2000, which is hereby incorporated by reference.

Figure 2:
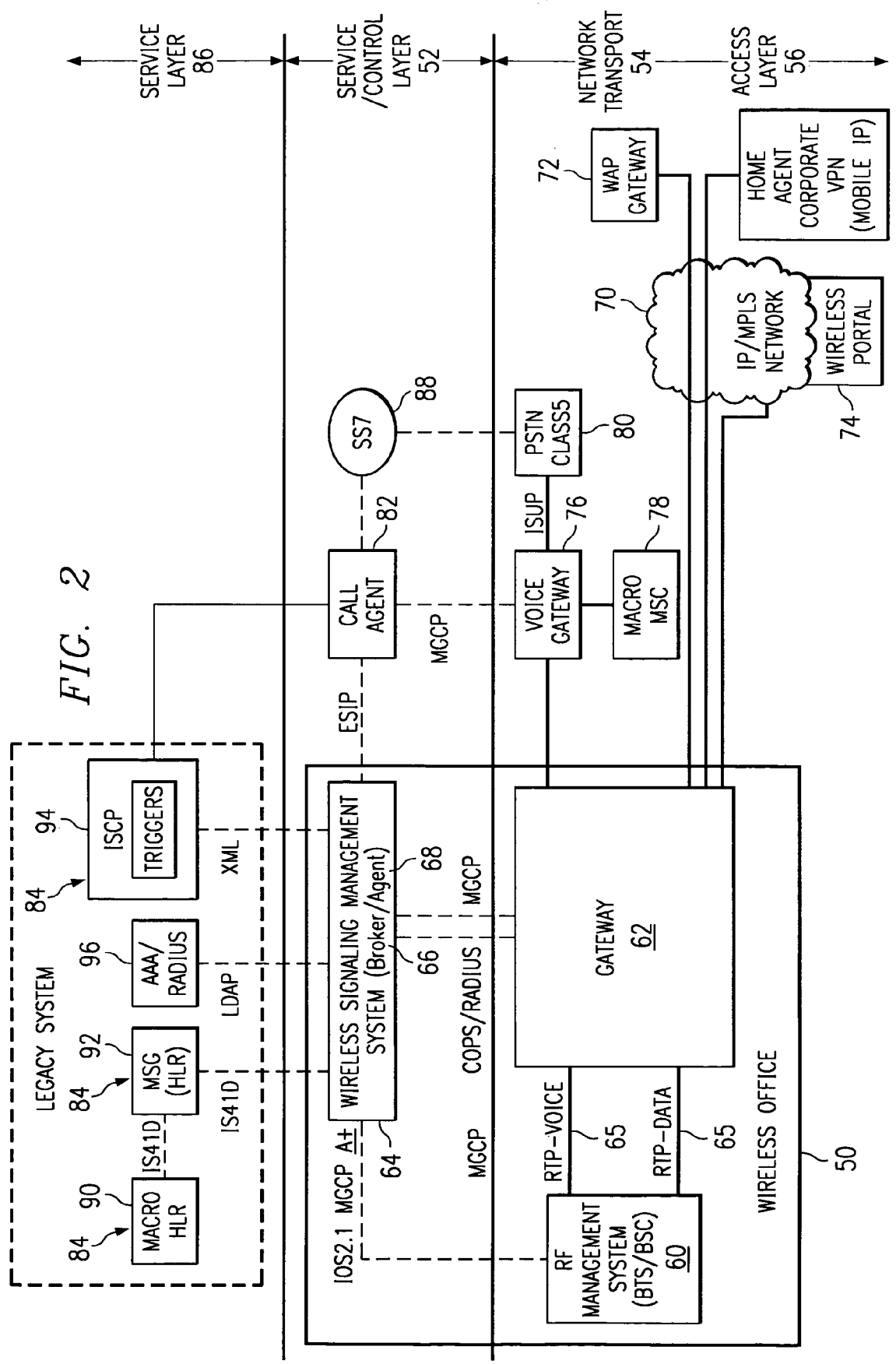
FIG. 2 is a block diagram illustrating details of the wireless network of FIG. 1 in accordance with one embodiment of the present invention.

FIG. 2 illustrates details of the wireless network in accordance with one embodiment of the present invention. In this embodiment, the radio frequency (RF), agent, broker and gateway functionality is implemented in an integrated wireless router 30. The wireless router 30 comprises logic stored in a computer processable medium for implementing functionality of the router 30. The logic may comprise software stored in a computer readable medium and/or instructions stored or encoded in hardware. It will be understood that the RF, agent, broker and gateway functionality may be distributed within the wireless network.

Referring to FIG. 2, a wireless office, or wireless access system 50 spans a session/control layer 52, a network/transport layer 54 and an access layer 56. The wireless access system 50 may be an enterprise or public carrier network device and includes a RF management system 60, an gateway 62, and a wireless signaling management system 64. The RF management system 60 is in the access layer 56 while the gateway 62 is in the network/transport layer 54. The wireless signaling management system 64 is in the session/control layer 52.

The RF management system 60 includes a base station (BST) and a base station controller (BSC) and/or other suitable equipment communicating wireless traffic with the mobile devices 44 in a corresponding cell 40 and/or neighboring cells. The RF management system, or RF station 60 may communicate with the mobile devices 44 using TDMA, CDMA, GSM, W-CDMA, CDMA 2000 and other suitable standards. In operation, the RF station 60 communicates traffic with the gateway 62 over real-time transport protocol (RTP) and other suitable protocol voice and data channels 65.

The gateway 62 is an air gateway for wireless traffic and processes and forwards traffic from the RF station 60 to an appropriate voice or data network and from a voice or data network to the RF station 60. In one embodiment, the air gateway 62 processes and forwards data traffic to the Internet or other Internet protocol (IP)/multiple protocol label switch (MPLS) network 70 or a wireless access protocol (WAP) gateway 72 for a home agent corporate virtual private network (VPN). The IP/MPLS network 70 may include one or more wireless portals 74. The air gateway 62 processes and forwards voice traffic to a voice gateway 76, and from the voice gateway 76 to a macro mobile switch controller (MSC) 78 of a legacy system or a Class 5 switch of a Public Switch Telephone Network (PSTN) 80. The data and voice networks are in the network/transport and access layers 54 and 56 of the wireless network.

The wireless signaling management system 64 comprises one or more discrete components and includes an air broker 66 and an air agent 68 that provide resource and mobility management for calls in the wireless network. In one embodiment, the wireless signaling management system 64 communicates with the RF station 60 using media gateway control protocol (MGCP) 2.1, or A+ protocols. In this embodiment, the wireless signaling management system 64 communicates with the air gateway 62 using the MGCP and Common Open Policy Services (COPS) or radius protocols.

To provide and support services for voice and data calls, the wireless signaling management system 64 communicates with a call agent 82 in the session/control layer 52 and with service agents 84 in a legacy system service layer 86. The call agent 82 further communicates with the voice gateway 76 and with an SS7 telephony node 88, which communicates with the PSTN 80. In a particular embodiment, the wireless signaling management system 64 communicates with the call agent 82 using an extended session initiation protocol (ESIP). In this embodiment, the call agent 82 communicates with the voice gateway 76 using the MGCP protocol while the voice gateway 76 communicates with the PSTN network 88 using the Integrated Services Digital Network (ISDN) User Part (ISUP) protocol.

The service agents 84 include a macro home location register (HLR) agent 90, a mobile switching gateway (MSG) (HLR) agent 92, an intelligent service platform (ISCP) agent 94 and an AAA/radius agent 96. As described in more detail below, the ISCP agent 94 provides programmable and intelligent services for data calls. The AAA/radius agent 96 provides administrative services for the wireless access device 50. In a particular embodiment, the macro HLR agent 90 communicates with the MSG agent 92 using an IS41D protocol. In this embodiment, the MSG agent 92 communicates with the wireless signaling management system 64 using the IS41D protocol, the ISCP agent 94 communicates with the wireless signaling management system 64 using the extended mark-up language (XML) protocol and the AAA/radius agent 96 communicates with the wireless signaling management system using the Lightweight Directory Access Protocol (LDAP) protocol. It will be understood that components in each of the layers 52, 54, 56 and 86 may communicate with other components using other suitable protocols without departing from the scope of the present invention.

As described in more detail below, the air gateway 62 and the wireless signaling management system 64 establish and maintain, or carry, voice and data calls in the wireless network. At the time a data call is established, service triggers are retrieved from the service agents 84 for the data call and stored in the air gateway 62 and/or air agent 68. The air gateway 62 and air agent 68 monitor content of the data call to provide filtering, prioritization, customization, and localization services. When conditions of a service trigger are met, the triggers are fired to service logic which may send alerts to the mobile user, control access to network resources and/or alter billing for the data call. The service logic may be downloaded with the triggers or stored in the service agents 84 or other suitable element. If the Service Logic is downloaded with the triggers, the ISCP agent 84 need not be notified of trigger events.

FIG. 3A is a flow diagram illustrating a method for providing services for data calls in a wireless network. Referring to 3A, the method begins at step 130 in which a wireless data call is established. The wireless data call 130 may be established through a number of discrete steps performed at the same time or at different times in the wireless network.

Proceeding to step 132, services events for the data call are loaded into a call monitoring system for the data call. The monitoring system is operable to identify the service events based on network activity and/or content of the data call. At step 134, the monitoring system monitors the data call in the network for service events.

At step 136, services are performed in response to the occurrence of associated events in the network and/or the content of the data call. One or more services may be performed during the duration of each data call. At step 138, the data call is terminated by the mobile device 44 and/or the network. Step 138 leads to the end of the process by which services are provided for wireless data calls.

Figure 3B:
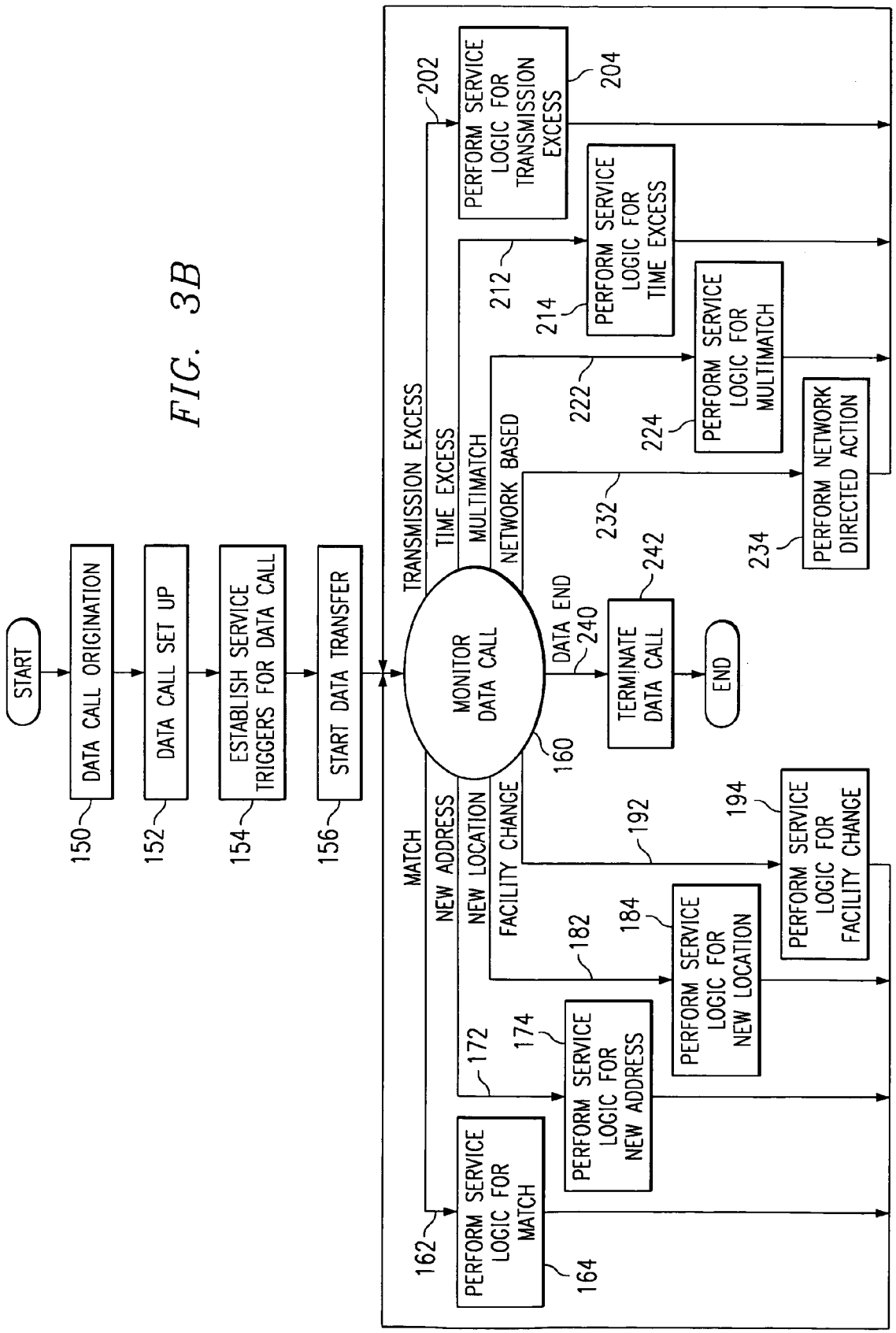

FIG. 3B is a flow diagram illustrating a method for providing services for data calls in a wireless network in accordance with a particular embodiment of the present invention. In this embodiment, the services comprise prepaid calling card services, location-based services, web filtering services, quality of service (QoS) based billing services, URL-based billing services, address-based services, and announcement services. The prepaid calling card services may comprise volume limited Internet or other network access services and time limited Internet or other network access services. The web filtering services may comprise access or denial to a list of websites and/or automatic website redirection. It will be understood that other suitable services may be provided for data calls through the air gateway 62 and/or air agent 64 without departing from the scope of the present invention.

Referring to FIG. 3B, the method begins at step 150 upon an origination message for a data call from a mobile device 44. A wireless data call is a communication session including a mobile device 44 in which non-voice and/or non-real-time information is exchanged between the mobile device 44 and a distinct device. The wireless data call may be conducted with a computing device over the Internet and include part or all non-real time data. At step 152, the data call requested by the mobile device 44 is set up. As previously described, the call is set up by the air gateway 62 in connection with the wireless signaling management system 64.

Next, at step 154, service triggers for the data call are established. The service triggers may be established by the air agent 68 accessing the ISCP agent 94 and/or other service agents 84 to identify and download service triggers for that data call. The service triggers for a data call may be identified by the phone number of the mobile device for the data call or based on a profile of the mobile device 44, access technology, user or other characteristic associated with the data call. The service triggers are stored in the air gateway 62 and/or the air agent 68.

Proceeding to step 156, data transfer is started for the data call. During the data call at state 160, the air gateway 62 and/or air agent 68 monitors content of the data call and/or the wireless network for service triggers. In response to detection of a service trigger, the air gateway 62 and/or air agent 68 initiate an associated service by launching or signaling to launch the associated service logic. As used herein, in response to means performing a specified action upon at least the occurrence of the identified event. The action may directly follow the event or follow an intervening action.

In response to a match trigger 162 during the data call, state 160 transitions to step 164. At step 164, service logic associated with the match trigger is performed. The match may be a URL match, a source and/or destination IP or other suitable address match, part number match or based on other suitable criteria. The services may comprise web filtering, including access or denial to a list of websites or automatic website redirection and/or URL-based billing. Upon completion of the service, step 164 transitions back to state 160 in which the data call is monitored for further service triggers.

In response to a new address trigger 172 during the data call, state 160 transitions to step 174. At step 174, service logic for the new address trigger is performed. The new address may be a new URL address, source and/or destination IP or other suitable address, part number or other suitable address criteria. The service logic may comprise web filtering and URL-based billing services. Upon completion of the service logic, step 174 returns to state 160 in which the data call is monitored for additional service triggers.

In response to a new location trigger 182 during the data call, state 160 transitions to step 184 in which service logic associated with the trigger is performed. The service logic may comprise location-based services. Upon completion of the service logic, step 184 returns to state 160 in which the data call is monitored for additional service triggers.

In response to a facility change trigger 192 during the data call, state 160 transitions to step 194. At step 194, service logic associated with the trigger is performed. The service logic may comprise announcement and other suitable services. Upon completion of the service logic, step 194 returns to state 160 in which the data call is monitored for additional service triggers.

In response to a transmission excess trigger 202 during the data call, state 160 transitions to step 204. At step 204, service logic associated with the trigger is performed. The service logic may comprise prepaid calling card services for volume limited Internet access in the forward and/or reverse directions. Upon completion of the service logic, step 204 returns to state 160 in which the data call is monitored for additional service triggers.

In response to a time excess trigger 212 during the data call, state 160 transitions to step 214. At step 214, service logic associated with the trigger is performed. The service logic may comprise prepaid calling card services for time limited Internet access and other suitable services. Upon the completion of the service logic, step 214 returns to state 160 in which the data call is monitored for additional service triggers.

In response to a multimatch trigger 222 during the data call, state 160 transitions to step 224. The multimatch may be the occurrence, together or separately, of any combination of specified triggers or the occurrence of one or more of a set of triggers. At step 224, service logic associated with the trigger is performed. The service logic may comprise prepaid calling card, location-based, web filtering, billing and other suitable services. Upon completion of the service logic, step 224 returns to state 160 in which the data call is monitored for additional service triggers.

In response to a network-based trigger 232 during the data call, state 160 transitions to step 234. The network-based trigger may be the status of the system or a component in the system. At step 234, the service logic is performed for the trigger. Service logic may comprise announcements, including advertisements and news delivery, data cleans or other suitable services. Upon completion of the service logic, step 234 returns to state 160 in which the data call is monitored for further service triggers.

In response to a data end trigger 240, state 160 transitions to step 242. At step 242, the data session for the call is terminated. Step 242 leads to the end of the process by which filtering, prioritization, customization and location services are provided for a data call based on the content of the data call and/or network-based events.

Figure 4A:
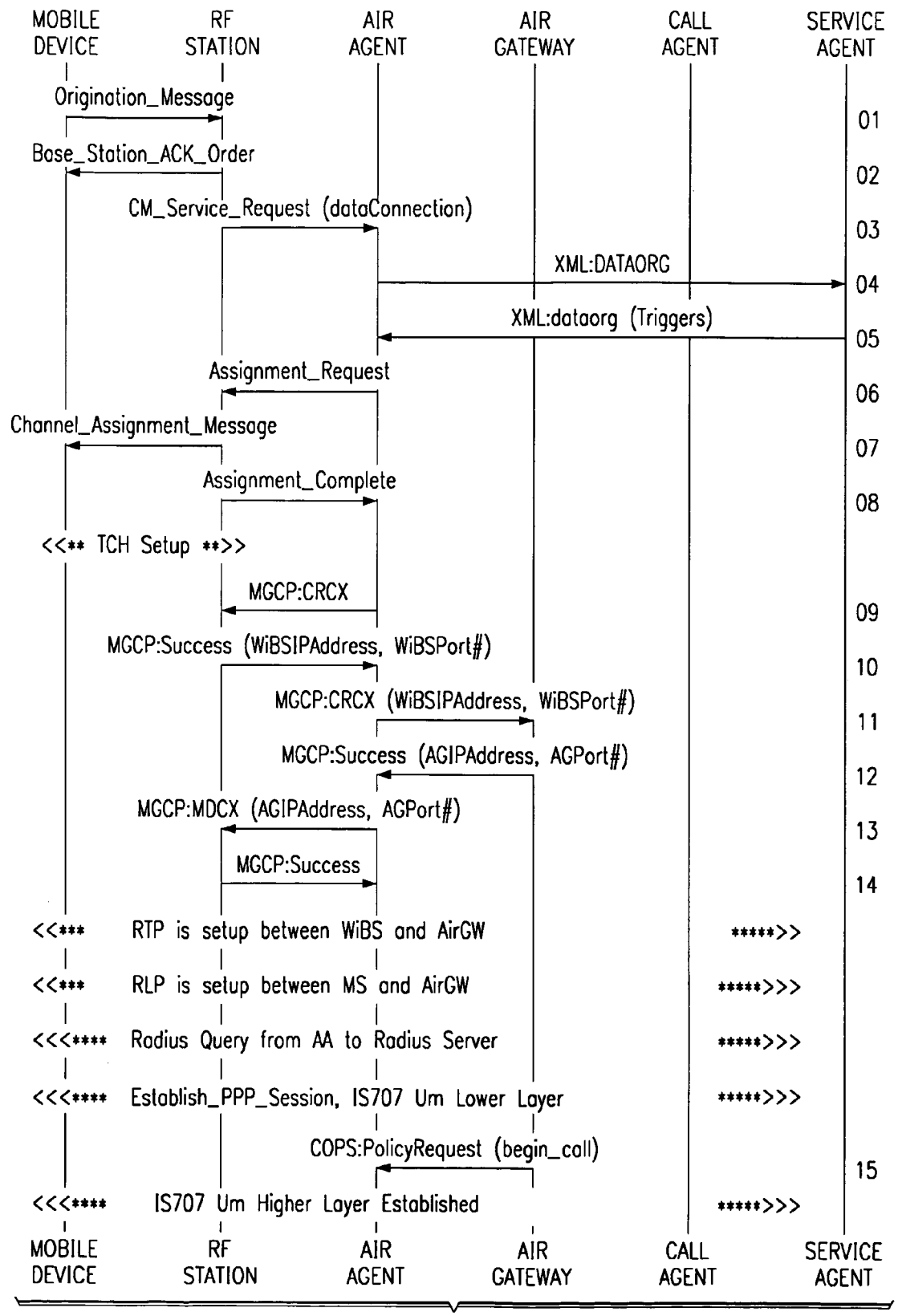
FIGS. 4A–C are a call flow diagram illustrating a methodology for mobile initiated call setup and clear for a data call in the wireless network of FIG. 2 in accordance with one embodiment of the present invention.
Figure 4B:
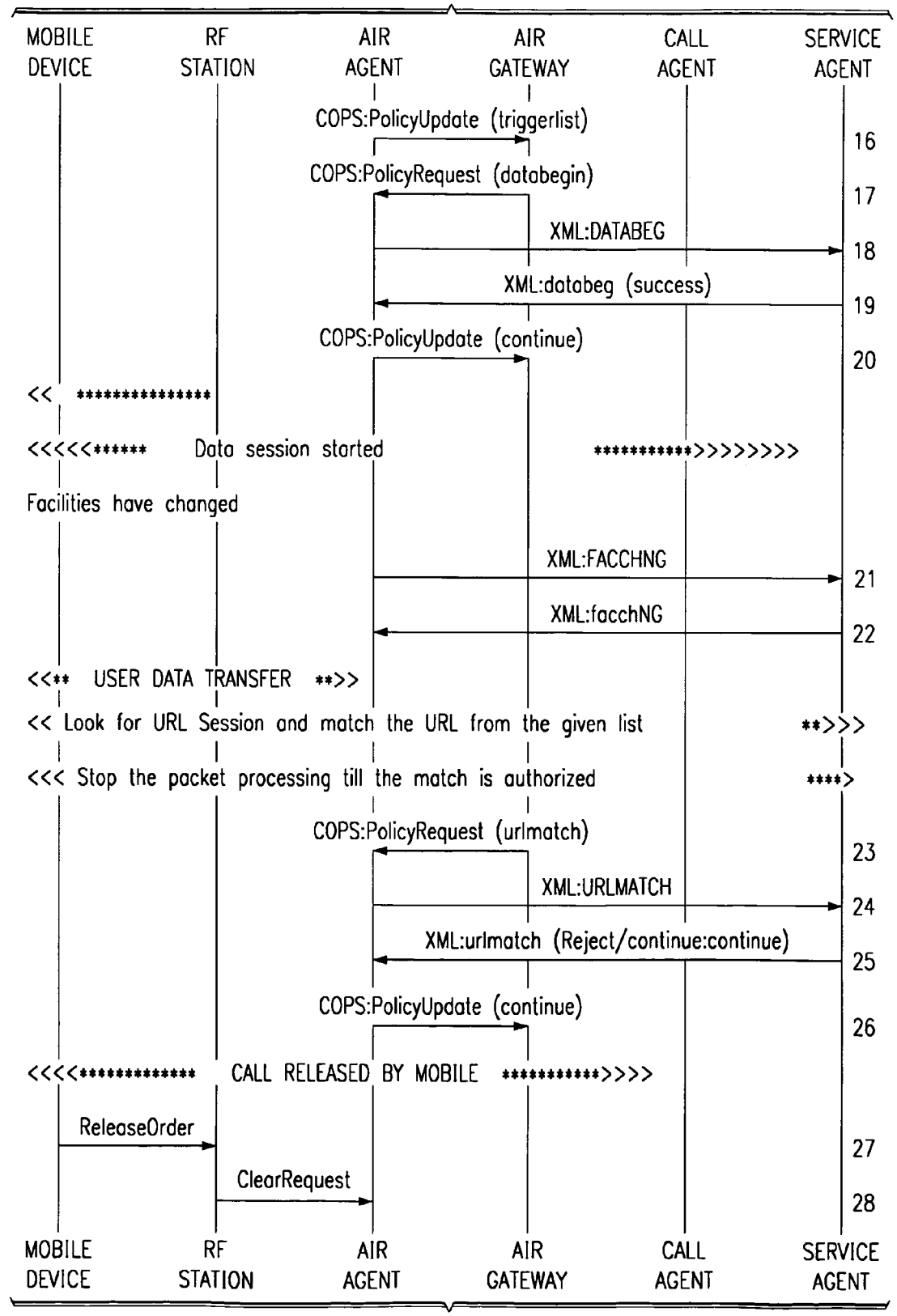
Figure 4C:
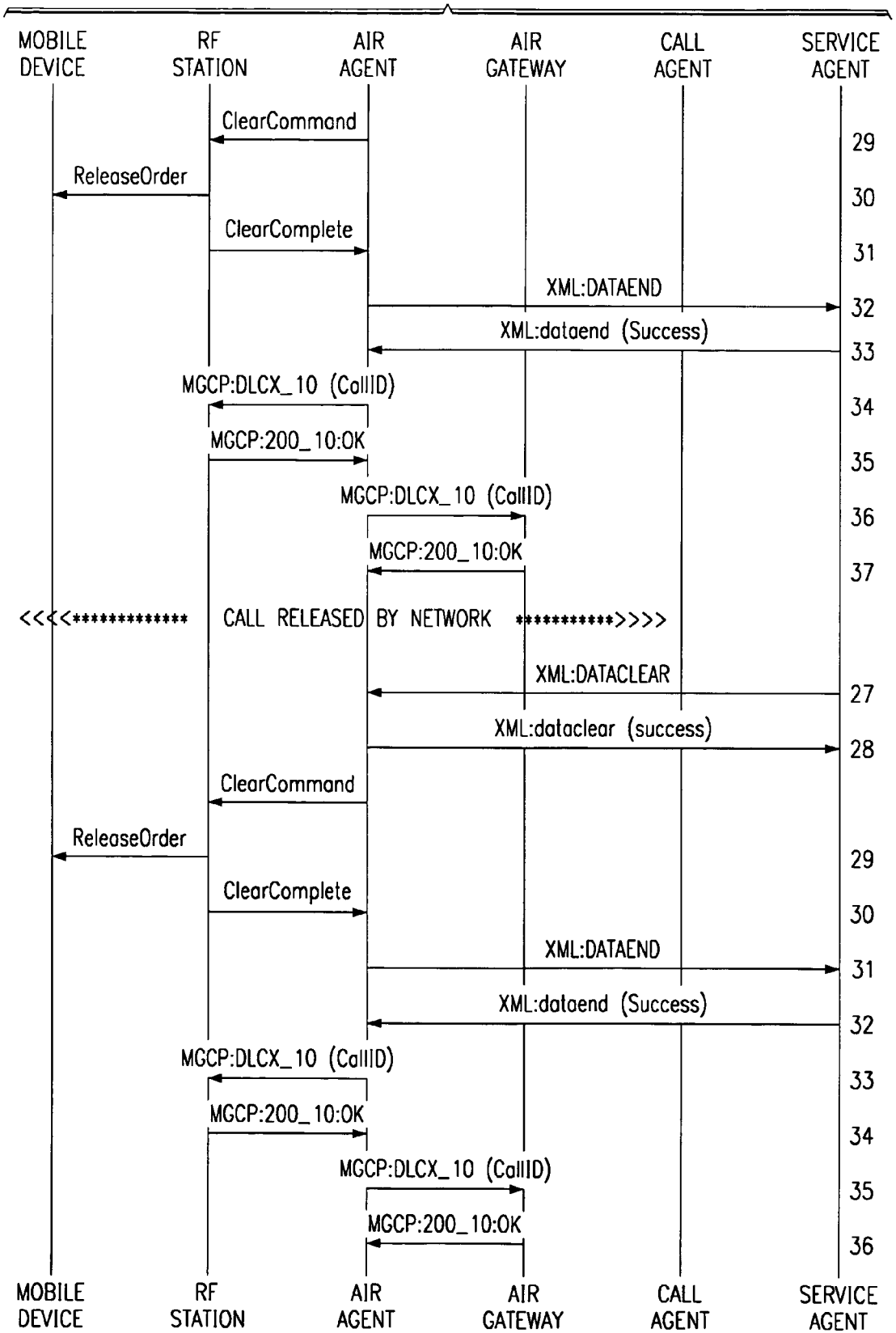

FIGS. 4A–C are call flow diagrams illustrating methodology for mobile initiated call set up and clear for a data call in a wireless network in accordance with one embodiment of the present invention. In this embodiment, content, signaling, messages, and/or triggers are sent and received between the mobile device 44, the RF station 60, air agent 68, air gateway 62, call agent 82, and MSG/ISCP service agents 84. It will be understood that data calls may be otherwise set up, provisioned with services, conducted and cleared without departing from the scope of the present invention.

Referring to FIGS. 4A–C, during call set up, a data origination (DATAORG) request is generated by the air agent 64 and transmitted to the MSG/ISCP service agents 84 for service triggers. The MSG/ISCP service agents 84 return the service triggers (dataorg) for the data call to the air agent 64. After channel assignment is complete, the traffic channel is set up. After traffic channel set up, the RTPs or other suitable protocol paths are set up between the base station 60 and the air gateway 62. Triggers are provided from the air agent 64 to the air gateway 62 using the COPS policy update. The data call may be released by the mobile device 44 with a release order signal to the RF station 60 and/or by the network with a data end signal to the air agent 68.

During a data session, data origination (dataorg), data begin (databegin), data end (dataend), URL match (URLmatch), location change (locchng), data clear (dataclear), forward transmission excess (fwdbytext), reverse transmission excess (revbytexd), time excess (timeexd), URL change (URLchng), multiple conditions matched (multimatch), data alert (dataalert), and facility change (faclchng) triggers may be provided for the data call. The dataorg comprises an origination request for a data session and a reply of a list of triggers from service logic. The databegin trigger monitors a data call for start of a data session and triggers service logic. The dataend trigger monitors the data call for an end of a data session and triggers service logic.

The URLmatch trigger monitors the mobile user accessing a particular URL and triggers service logic. The locchng trigger monitors the mobile user moving to a new location such as another cell and triggers service logic. The dataclear trigger is from the ISCP agent 94 to the air agent 68 and is used to clear a data session. The fwdbytext trigger monitors transmissions exceeding a defined number of bytes in a forward direction, or path, and is sent from the air agent 68 to the ISCP agent 94. The revbytexd trigger monitors transmissions exceeding a defined number of bytes in the reverse direction and is sent from the air agent 68 to the ISCP agent 94. The timeexd trigger monitors sessions time excesses and is sent from the air agent 68 to the ISCP agent 94.

The URLchng trigger monitors mobile users accessing a new URL and triggers service logic. The multimatch trigger monitors multiple conditions and is sent from the air agent 68 to the ISCP agent 94 when one or more and/or all of the conditions are matched. The dataalert trigger alerts the mobile user with a specific content such as a stock quote, advertisement or news and is sent from the service logic to the mobile user. The faclchng trigger monitors changes in the status of facilities such as handoffs to other air gateways 62, failure of links, routes, QoS and depletion of any resources.

FIGS. 5–17 illustrate exemplary messages for providing services for data calls in accordance with a particular embodiment of the present invention. The fields, field type, and field comments are provided for each message. Messages are sent from the air agent 68 to the ISCP and/or other service agent 84 and in the opposite direction. These messages are sent due to triggers that are set either in the profile of the mobile device 44 or downloaded during the session establishment phase. These triggers are activated during the beginning of the session, middle of the session or termination of the session. Messages are exchanged through the XML format.

FIGS. 5A–B illustrate exemplary messages for provisioning data services for a data call in a wireless network. Referring to FIG. 5A, the DATAORG is sent by the air agent 68 to the ISCP agent 94 to request the data session origination treatment on behalf of a registered mobile device 44. Referring to FIG. 5B, the dataorg message is the response from the ISCP agent 84.

FIGS. 6A–B illustrate exemplary messages for initiating data transfer for a data call in a wireless network. Referring to FIG. 6A, the DATABEGIN message is sent by the air agent 68 to the MSG/ISCP agents 84 while originating a data session through the air gateway 62. This trigger is sent when a PPP session is established and data transfer is started. Referring to FIG. 6B, the databegin message is the response from the ISCP agent 94.

FIGS. 7A–B illustrate exemplary messages for terminating data transfer for a data call in a wireless network. Referring to FIG. 7A, the DATAEND message is sent by the air agent 68 to the ISCP/MSG agents 84. This trigger is sent after a PPP session is cleared. Referring to FIG. 7B, the dataend message is the response from the ISCP agent 94.

FIGS. 8A–B illustrate exemplary messages for dataclear services for data call in a wireless network. Referring to FIG. 8A, the DATACLEAR message occurs in the middle of a call. The message is sent from the MSG/ISCP agents 84 to the air agent 68. The message is network generated and asynchronous. After receiving the message from the ISCP agent 94, the air agent 68 starts the clearing procedures. These procedures include the clear messages which are sent to the air gateway 62. Referring to FIG. 8B, the dataclear message is the response from the air agent 68.

FIGS. 9A–B illustrate exemplary messages for forward direction transmission access services for a data call in a wireless network. Referring to FIG. 9A, the FWDBYTEXD message is sent by the air agent 68 to the MSG/ISCP agents 84 during a data session. The air gateway 62 is set up to count the number of packets received from the mobile device 44. If the total volume of the bytes in the session exceeds the number of bytes present by the ISCP agent 94, then a trigger is sent to the ISCP agent 94. A notification message is sent from the air gateway 62 to the air agent 68 after the detection. The air agent 68 subsequently sends a trigger to the ISCP agent 94 about this event. Also, when the number of bytes exceeds the present value, all of the subsequent packets are discarded, except for packets already queued in the transmit queues. Referring to FIG. 9B, the fwdbytexd message is the response from the ISCP agent 94.

FIGS. 10A–B illustrate exemplary messages for reverse direction transmission access services for a data call in a wireless network. Referring to FIG. 10A, the REVBYTEXD message is sent by the air agent 68 to the MSG/ISCP agents 84 during a data session. The air gateway 62 is set up to count the number of packets transmitted to the mobile device 44. If the total volume of the bytes in the session exceeds the number of bytes preset by the ISCP agent 94, then a trigger is sent to the ISCP agent 94. A notification message is sent from the air gateway 62 to the air agent 68 after the detection. The air agent 68 subsequently sends a trigger to the ISCP agent 94 about the event. Also, when the number of bytes exceeds the preset value, all subsequent packets are discarded. except for packets already queued in the transmit queues. Referring to FIG. 10B, the revbytexd message is the response from the ISCP agent 94.

FIGS. 11A–B illustrate exemplary messages for time access services for a data call in a wireless network. Referring to FIG. 11A, the TIMEEXD message is sent by the air agent 68 to the MSG/ISCP agents 84 during a data session. The air gateway 62 is set up to count the duration of the session. If the total duration of the session exceeds the time preset by the ISCP agent 94, then a trigger is sent to the ISCP agent 94. A notification message is sent from the air gateway 62 to the air agent 68 after the detection. The air gateway 64 subsequently sends a trigger to ISCP agent 94 about the event. When the duration exceeds the preset value, all subsequent packets are discarded with packets already queued in the transmit queues being transmitted. Referring to FIG. 11B, the timeexd message is the response from the ISCP agent 94.

FIGS. 12A–B illustrate exemplary messages for URL matching services for a data call in a wireless network. Referring to FIG. 12A, the URLmatch message occurs during the middle of the call. This trigger is sent from the air agent 68 to the MSG/ISCP agents 84. The air gateway 62 detects that a URL from a list provided by the ISCP/MSG agents 84 is matched. A notification message is sent from the air gateway 62 to the air agent 68 after the detection. The air agent 68 subsequently sends a trigger to the ISCP agent 94 about the event. Referring to FIG. 12B, the URLmatch is the response from the ISCP agent 84.

FIGS. 13A–B illustrate exemplary messages for location change services for a data call in a wireless network. Referring to FIG. 13A, the LOCCHNG message is sent from the air agent 68 to the MSG/ISCP agents 84 when the mobile device 44 has moved from one sector to another sector or other specified location-based event has occurred. Referring to FIG. 13B, the locchng message is the response from the ISCP agent 94.

FIGS. 14A–B illustrate exemplary messages for multiplematch services for a data call in a wireless network. Referring to FIG. 14A, the MULTIMATCH message is sent when one or more conditions detected by the air gateway 62 and/or air agent 68 are matched. Referring to FIG. 14B, the multimatch message is the response from the ISCP agent 94.

FIGS. 15A–B illustrate exemplary messages for URL change services for a data call in a wireless network. Referring to FIG. 15A, the URLCHNG message is sent from the air agent 68 to the MSG/ISCP agents 84. The air gateway 62 detects that there is a change in the URL being accessed by the air gateway 62. A notification message is sent from the air gateway 62 to the air agent 68 after detection. The air agent 68 subsequently sends a trigger to the ISCP agent 94 about the event. Referring to FIG. 15B, the urlchng message is the response from the ISCP agent 94.

FIGS. 16A–B illustrate exemplary messages for data alert services for a data call in a wireless network. Referring to FIG. 16A, a DATALERT message is sent from the MSG/ISCP agents 84 to the mobile device 44/air agent 68. The alerts include advertisements, preset notifications and other announcements. In one embodiment, an XML file containing the alert information is sent from the ISCP agent 94. This XML data file is sent to the already running application on the mobile device 44, such as a screen running an HTTP session. Referring to FIG. 16B, the datalert message is the response from the mobile device 44.

FIGS. 17A–B illustrate exemplary messages for facility status services for a data call in a wireless network. Referring to FIG. 17A, the FACLCHNG message is sent from the air agent 68 to the MSG/ISCP agents 84 when a change in air gateway ID/air agent is detected due to handoff, a change in bandwidth in the middle of a session has occurred, such as when the mobile device requests additional channels and/or bandwidth, or resource depletion occurs due to congestion, links down and/or rerouting of data. Referring to FIG. 17B, the faclchng message is a response from the ISCP agent 94.

FIGS. 18A–U illustrate parameters for the service messages in accordance with a particular embodiment of the present invention. Specifically, FIG. 18A illustrates message identifiers, 18B illustrates data transaction capabilities, 18C illustrates action responses, 18D illustrates call types, 18E illustrates triggers and 18F illustrates trigger actions. FIG. 18G illustrates the IP address of the trigger component, 18H illustrates the URL address of the trigger component, 18I illustrates the trigger component header, 18J illustrates the trigger component type and 18K illustrates the user name. FIG. 18L illustrates the mobile IP addresses, 18M the data session initiation time stamps, 18N the data session termination time stamps, 18O the URL match time stamps, 18P the last URL accessed by a user, 18Q the current URL accessed by a user, 18R the release reason, 18S the reasons for facility change, 18T change facilities and 18U session records. It will be understood that other or different messages and message parameters may be used for providing services to data calls without departing from the scope of the present invention.

Although the present invention has been described with several embodiments, various changes and modifications may be suggested to one skilled in the art. It is intended that the present invention encompass such changes and modifications as fall within the scope of the appended claims.

What is claimed is:

1. A method for providing services for wireless data calls, comprising:
    establishing a wireless data call with a mobile device;
    monitoring the content of communications with the mobile device on the wireless data call at an air gateway;
    receiving at an air agent coupled to the air gateway one or more service triggers from an intelligent service platform agent;
    detecting in the content at the air gateway a predefined event based on the one or more service triggers, the predefined event associated with a wireless data call service;
    initiating the service for the wireless data call in response to detecting the predefined event in the content;
    wherein the predefined event comprises a match of a uniform resource locator (URL) requested for access by the mobile device with a particular URL; and
    wherein the wireless data call service comprises a web service associated with the URL requested for access.

2. The method of claim 1, further comprising:
    detecting in the content a plurality of predefined events together associated with a wireless data call service; and
    initiating the service for the data call in response to detecting a predefined number of the predefined events.

3. The method of claim 1, wherein the web service comprises denying the mobile device access to the web site of the URL requested for access.

4. The method of claim 1, wherein the web service comprises automatically redirecting the mobile device to a different URL than the URL requested for access.

5. The method of claim 1, wherein the web service comprises billing a user of the mobile device for accessing the URL requested for access.

6. The method of claim 1, further comprising:
detecting in the content a plurality of predefined events, each associated with a wireless data call service; and
initiating a service for the wireless data call in response to detecting the associated predefined event.

7. The method of claim 1, further comprising monitoring the content of communications with the mobile device on the wireless data call in real-time.

8. A system for providing services for wireless data calls, comprising:
a computer processable medium; and
logic stored on the computer processable medium, the logic operable to:
establish a wireless data call with a mobile device;
monitor the content of communications with the mobile device on the wireless data call at an air gateway;
receive at an air agent coupled to the air gateway one or more service triggers from an intelligent service platform agent;
detect in the content at the air gateway a predefined event based on the one or more service triggers, the predefined event associated with a wireless data call service; and
initiate the service for the wireless data call in response to detection of the predefined event in the content;
wherein the predefined event comprises a match of a uniform resource locator (URL) requested for access by the mobile device with a particular URL; and
wherein the wireless data call service comprises a web service associated with the URL requested for access.

9. The system of claim 8, the logic further operable to:
detect in the content a plurality of predefined events together associated with a wireless data call service; and
initiate the service for the data call in response to detecting a predefined number of the predefined events.

10. The system of claim 8, wherein the web service comprises denying the mobile device access to the web site of the URL requested for access.

11. The system of claim 8, wherein the web service comprises automatically redirecting the mobile device to a different URL than the URL requested for access.

12. The system of claim 8, wherein the web service comprises billing a user of the mobile device for accessing the URL requested for access.

13. The system of claim 8, the logic further operable to:
detect in the content a plurality of predefined events, each associated with a wireless data call service; and
initiate a service for the wireless data call in response to detecting the associated predefined event.

14. The method of claim 8, the logic further operable to monitor the content of communications with the mobile device on the wireless data call in real-time.

15. A system for providing services for wireless data calls, comprising:
means for establishing a wireless data call with a mobile device;
means for monitoring the content of communications with the mobile device on the wireless data call at an air gateway;
means for receiving at an air agent coupled to the air gateway one or more service triggers from an intelligent service platform agent;
means for detecting in the content at the air gateway a predefined event based on the one or more service triggers the predefined event associated with a wireless data call service;
means for initiating the service for the wireless data call in response to detection of the predefined event in the content;
wherein the predefined event comprises a match of a uniform resource locator (URL) requested for access by the mobile device with a particular URL; and
wherein the wireless data call service comprises a web service associated with the URL requested for access.

16. The system of claim 15, further comprising:
means for detecting in the content a plurality of predefined events together associated with a wireless data call service; and
means for initiating the service for the data call in response to detecting all of the predefined events.

17. The system of claim 15, wherein the web service comprises denying the mobile device access to the web site of the URL requested for access.

18. The system of claim 15, wherein the web service comprises automatically redirecting the mobile device to a different URL than the URL requested for access.

19. The system of claim 15, wherein the web service comprises billing a user of the mobile device for accessing the URL requested for access.

20. A method for providing services for wireless data calls, comprising:
establishing a wireless data call with a mobile device;
monitoring the content of communications with the mobile device on the wireless data call at an air gateway;
receiving at an air agent coupled to the air gateway one or more service triggers from an intelligent service platform agent;
detecting in the content at the air gateway a predefined event based on the one or more service triggers, the predefined event associated with a wireless data call service;
initiating the service for the wireless data call in response to detecting the predefined event in the content; and
wherein the predefined event comprises a use of transmission resources in excess of a predefined amount.

21. The method of claim 20, wherein the use of transmission resources in excess of a predefined amount comprises a use of transmission resources in a forward direction from the mobile device to a wireless network in excess of a predefined amount.

22. The method of claim 20, wherein the use of transmission resources in excess of a predefined amount comprises a use of transmission resources in a reverse direction from a wireless network to the mobile device in excess of a predefined amount.

23. The method of claim 20, wherein the wireless data call service comprises a prepaid calling card service limiting access to the Internet based on the use of transmission resources.

24. The method of claim 23, wherein the prepaid calling card service limiting access to the Internet based on the use of transmission resources limits access to the Internet to a predefined amount of time.

25. The method of claim 23, wherein the prepaid calling card service limiting access to the Internet based on the use of transmission resources limits transmission with the Internet to a predefined volume.

26. The method of claim 25, wherein the predefined volume comprises a predefined number of transmission bytes and further comprising:
  determining that a number of transmitted bytes exceeds the predefined number of transmission bytes;
  transmitting any packets in a transmit queue; and
  discarding subsequent packets received for transmission.

* * * * *